(12) United States Patent
Graham et al.

(10) Patent No.: US 6,256,546 B1
(45) Date of Patent: Jul. 3, 2001

(54) SYSTEM AND METHOD FOR NUMERICAL CONTROL PROCESSING OF AN IN-PROCESSING PART

(75) Inventors: Michael Evans Graham, Slingerlands, NY (US); John Dennis Jackson, Wyoming, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/161,367

(22) Filed: Sep. 28, 1998

(51) Int. Cl.[7] .................................................. G05B 13/04
(52) U.S. Cl. ................................. 700/30; 700/29
(58) Field of Search ................................. 700/29, 30, 31, 700/108, 193

(56) References Cited

U.S. PATENT DOCUMENTS

| | | | |
|---|---|---|---|
| 4,370,721 | 1/1983 | Berenberg et al. | 700/195 |
| 4,382,215 | 5/1983 | Barlow et al. | 318/568.1 |
| 5,016,199 | * 5/1991 | McMurty et al. | 702/168 |
| 5,208,763 | * 5/1993 | Hong et al. | 702/95 |
| 5,446,673 | * 8/1995 | Bauer et al. | 700/195 |
| 5,529,441 | * 6/1996 | Kosmowski et al. | 408/1 R |
| 5,552,992 | * 9/1996 | Hunter | 700/118 |
| 5,873,822 | * 2/1999 | Ferre et al. | 600/407 |
| 5,903,459 | * 5/1999 | Greenwood et al. | 700/110 |
| 5,917,726 | * 6/1999 | Pryor | 700/96 |

FOREIGN PATENT DOCUMENTS

WO930948    5/1993   (WO).

* cited by examiner

Primary Examiner—William Grant
Assistant Examiner—Chad Rapp
(74) Attorney, Agent, or Firm—David C. Goldman; Jill M. Breedlove

(57) ABSTRACT

A system and method for numerical control processing of an in-process part. A mathematical mapping is generated which approximates the deformation of the in-process part as measured against a nominal model. The mapping is applied to nominal NC tool paths to generate modified tool paths that travel in the distorted coordinate space of the in-process part. A result is that local features may be machined into the in-process parts in reasonable locations, and non contact measurement systems as well as surface finishing systems can travel at a more constant distance from the surface of the in-process part.

31 Claims, 7 Drawing Sheets

SYSTEM AND METHOD FOR NUMERICAL CONTROL PROCESSING OF AN IN-PROCESSING PART

BACKGROUND OF THE INVENTION

This invention relates generally to numerical control (NC) processing and more particularly to developing a deformation model between an in-process part and a model of the nominal part and using the deformation model to modify nominal NC tool and inspection paths for processing the in-process part.

NC processing operations generally allow direct linkage of shop floor processes (e.g., forging, machining or inspecting) with a mathematically exact description of a carefully designed part also referred to as a nominal model. In these types of NC processing operations, it is not unusual for an in-process part to vary from the nominal model. This variation can result in excessive setup time or even scrap. For example, consider an NC drilling operation of a sheet metal part for a combustor with a laser tool. In this NC drilling operation, a rotary table supports the sheet metal part while the laser tool drills boring holes in the part at a specific angle. An NC program uses nominal NC tool paths designed for the nominal model to drill the boring holes in the part. A problem with this operation is that the actual in-process part varies or is deformed from the nominal model. This causes the laser tool to drill the boring holes in improper locations along the surface of the in-process part. A part that has holes drilled into improper locations along its surface will typically have to be discarded as scrap. In order to avoid this NC processing error and other similar errors, there is a need for a system and a method that can modify the nominal NC tool paths to more closely match the in-process part.

BRIEF SUMMARY OF THE INVENTION

This invention is able to modify the nominal NC tool paths to more closely match the in-process part by using shape measurements of the part to modify the NC control paths used in subsequent operations. From the shape measurements on the surface of the in-process part, a mathematical mapping is generated which approximates the deformation of the part as measured against the nominal model. The mapping is applied to the tool paths in the coordinate space of the original part in order to modify those tool paths to travel in the distorted coordinate space of the in-process part. A result of this invention is that local features may be machined into the in-process parts in reasonable locations, and non contact measurement systems as well as surface finishing systems can travel at a more constant distance from the surface of the in-process part.

This invention provides a system, a method and an article of manufacture for NC processing of an in-process part. In the system embodiment there is a nominal model of the in-process part. A measuring means measures a series of n points on the in-process part. A processor generates a deformation model that approximates the deformation of the measured part relative to the nominal model. The processor comprises a determining means for determining a plurality of mapping functions for mapping point locations from the nominal model to approximate measured locations of points on the in-process part. An optimizing means optimizes the plurality of mapping functions to minimize the distance between the point locations from the nominal model to the measured locations of points on the in-process part. A transforming means transforms the point locations from the nominal model to the measured locations of points on the in-process part according to the plurality of optimized mapping functions. A computerized numerical controller controls the processing of the in-process part according to the deformation model. Both the method and the article of manufacture embodiments of this invention are similar in scope to the system embodiment.

DETAILED DESCRIPTION OF THE INVENTION

Figure 1:
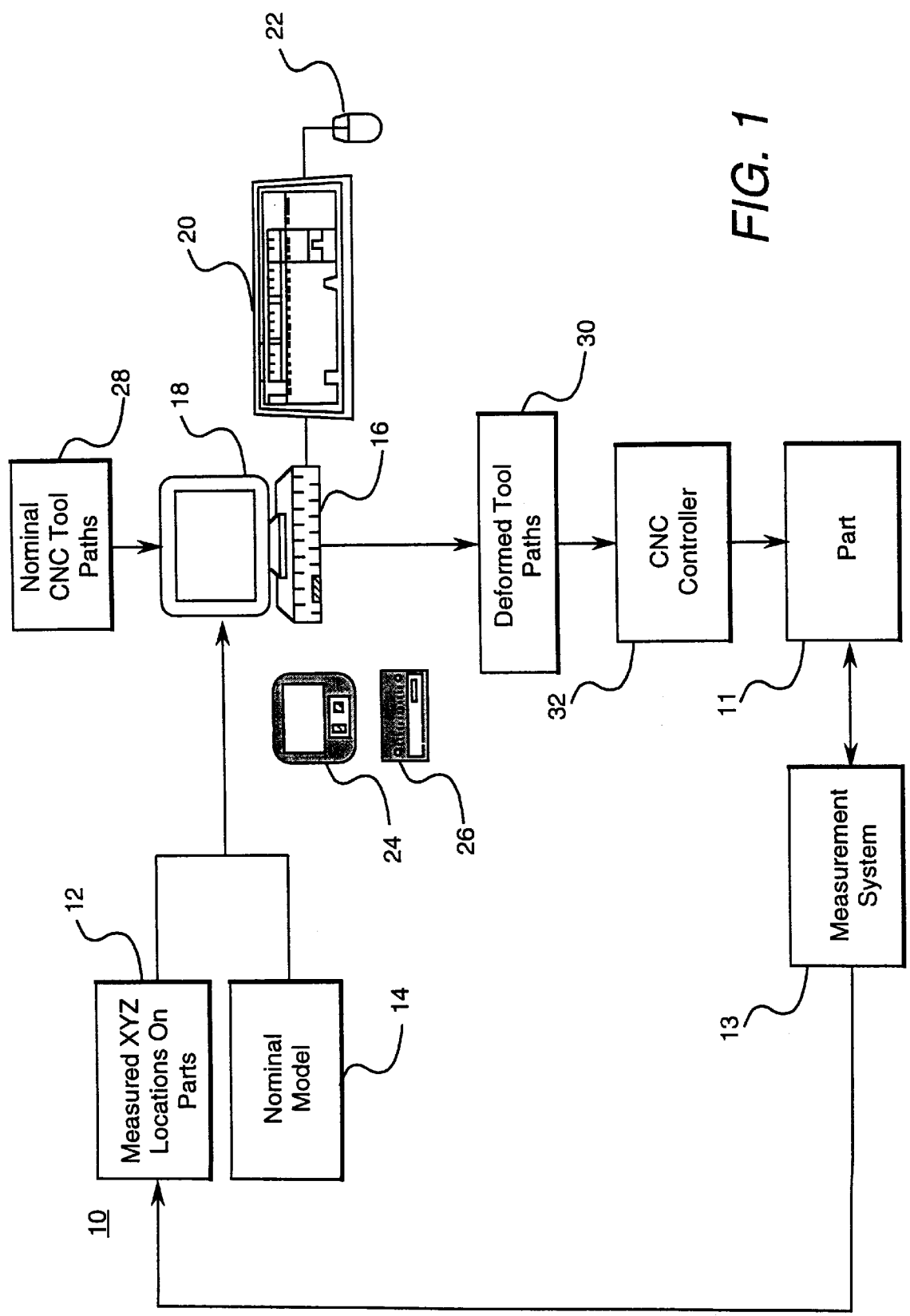
FIG. 1 shows a block diagram of a system for NC processing of an in-process part according to this invention.

FIG. 1 shows a block diagram of a system 10 for NC processing of an in-process part 11 according to this invention. The NC processing system 10 comprises a series of measurements 12 obtained from the in-process part 11 by a measurement system 13. The measurements are in the x, y, z coordinate system and is referred to as the measured coordinate system. In this invention, the measurement system 13 may be a well known measurement device such as a coordinate measuring machine (CMM), an x-ray scanning machine, an optical scanning machine, or an ultrasound scanning machine, which obtains the series of measurements of the part. The NC processing system 10 also comprises a model 14 of a nominal part of how the in-process part is to look after undergoing a particular manufacturing operation. The nominal model comprises a plurality of locations in the X, Y, Z coordinate system and is referred to as the nominal model coordinate system.

A computer 16 receives the series of part measurements 12 and the nominal model 14 and generates a deformation model that approximates the deformation of the measured part relative to the nominal model. In this invention the computer is a general purpose computer such as a work station, a personal computer or a machine controller. The computer 16 comprises a processor and a memory including random access memory (RAM), read only memory (ROM) and/or other components. Attached to the computer 16 are a monitor 18, a keyboard 20, and a mouse device 22. Those skilled in the art will recognize that the computer can operate without the use of the keyboard and the mouse. The computer 16 operates under control of an operating system stored in the memory to present data such as the series of part measurements and the nominal model to an operator on the display of the monitor 18 and to accept and process commands from the operator via the keyboard 20 and the mouse device 22. The computer 16 generates the deformation model using one or more computer programs or applications through a graphical user interface. Set forth below is a more detailed discussion of how the computer 16 generates the deformation model. A computer-readable medium e.g., one or more removable data storage devices 24 such as a floppy disc drive or a fixed data storage device 26 such as a hard drive, a CD-ROM drive, or a tape drive tangibly embody the operating system and the computer programs implementing this invention. The computer programs are programmed in C, but other languages such as FORTRAN, C++, or JAVA may be used.

The NC processing system 10 also comprises a nominal of computerized NC (CNC) tool paths 28 for operating a particular tool for manufacturing the in-process part. After generating the deformation model, the computer 16 modifies the nominal CNC tool paths 28 to the measured coordinate system of the part according to the deformation model. Set forth below is a more detailed discussion of how the computer 16 modifies the nominal CNC tool paths 28. The modification of the nominal CNC tool paths results in deformed tool paths 30. A computer numerical controller (CNC) 32 uses the deformed tool paths 30 to process the part 11.

Figure 2:
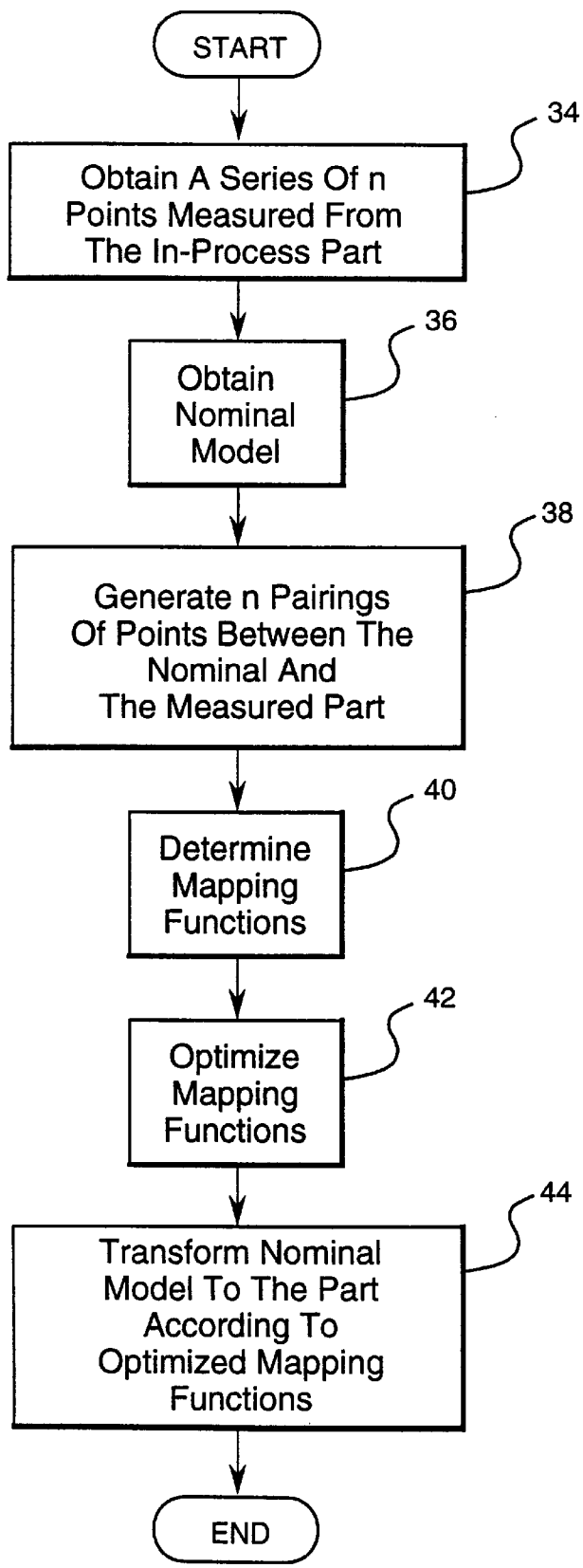
FIG. 2 shows a flow chart setting forth the steps for generating a deformation model according to this invention.
Figure 3:
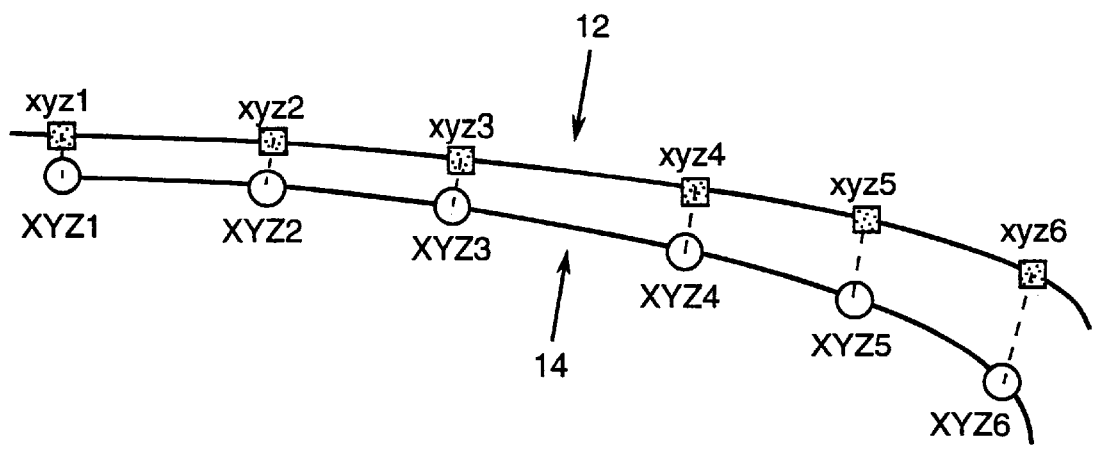
FIG. 3 shows a schematic of point pairings generated between the surfaces of a nominal model and an in-process part according to this invention.

FIG. 2 shows a flow chart setting forth the steps for generating the deformation model according to this invention. The computer obtains a series of n (x, y, z) points measured on the in-process part at 34. Next, the computer obtains the nominal model of the part at 36. The computer then generates a series of n pairings between the nominal model (X, Y, Z) points and the n series of measured (x, y, z) points on the part at 38. Each of the n pairings between the nominal model and the measured series of n points substantially correspond to each other. FIG. 3 shows a schematic of point pairings generated between the surfaces of the nominal model 14 and the measurements 12 of the in-process part. The measured points $(x_i, y_i, z_i)$ on the in-process part are points and vectors in the measured coordinate system, while the points $(X_i, Y_i, Z_i)$ on the nominal model are points and vectors in the nominal model coordinate system. FIG. 3 shows that the point pairings generated between the surfaces of the nominal model 14 and the measurements 12 of the in-process part are as follows:

| Part | Nominal |
|---|---|
| $x_1, y_1, z_1$ → | $X_1, Y_1, Z_1$ |
| $x_2, y_2, z_2$ → | $X_2, Y_2, Z_2$ |
| $x_3, y_3, z_3$ → | $X_3, Y_3, Z_3$ |
| ⋮ | ⋮ |
| $x_n, y_n, z_n$ → | $X_n, Y_n, Z_n$ |

Referring back to FIG. 2, after generating the series of n pairings between the nominal model points and the measured points on the in-process part, the computer determines a plurality of mapping functions for mapping point locations from the nominal model to approximate measured locations of points on the part at 40. The plurality of mapping functions comprise a set of functions $f_1, f_2, f_3$ that map the nominal model point locations $X_i, Y_i, Z_i$ to approximate the locations of the measured part points $x_i, y_i, z_i$. The set of mapping functions are as follows:

$$f_1(X_i, Y_i, Z_i) - x_i = X_{ierror}$$

$$f_2(X_i, Y_i, Z_i) - y_i = Y_{ierror}, \quad i=1, \ldots, i, \ldots n$$

$$f_3(X_i, Y_i, Z_i) - z_i = Z_{ierror}$$

wherein $X_{ierror}, Y_{ierror}, Z_{ierror}$ and are the differences between the nominal model point locations and the measured part locations. Those skilled in the art will recognize that other mathematical functions such as polynomial functions, trigonometric functions or logical functions can be used as the mapping functions.

Next, the computer 16 optimizes the mapping functions to minimize the distance between the point locations from the nominal model to the measured locations of points on the in-process part at 42. The computer uses the following optimization function to minimize the distance between the point locations from the nominal model to the measured locations of points on the in-process part:

$$\text{Minimize} \sum_{i=1}^{n} (X_{ierror}^2 + Y_{ierror}^2 + Z_{ierror}^2)$$

Those skilled in the art will recognize that other mathematical functions can be used as the optimization function. For example, depending on the desired outcome, the optimization function may be:

$$\text{Minimize} \sum_{i=1}^{n} (X_{ierror} + Y_{ierror} + Z_{ierror})$$

Figure 4:
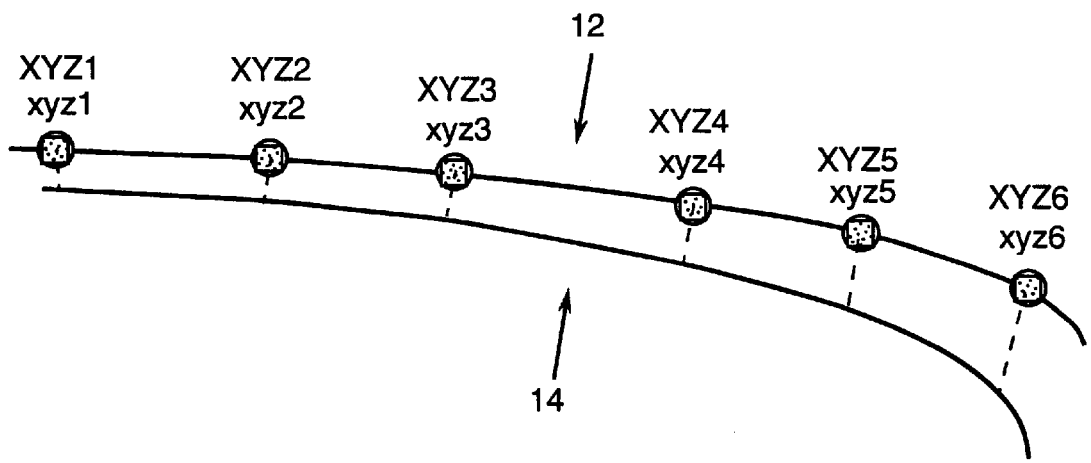
FIG. 4 shows a schematic of nominal model surface points transformed to reside on or substantially near an in-process part surface according to this invention.

After optimizing the mapping functions, the computer then transforms the point locations from the nominal model to the measured locations of points on the in-process part at 44. In particular, the optimized functions act as basis functions to transform the nominal model coordinates and vectors to reflect the deformations measured in the in-process part; the result is a set of deformed coordinates and vectors mapped to the in-process part. The transformation enables the original set of nominal model points to reside on or substantially near the actual measured points. FIG. 4 shows a schematic of nominal model surface points transformed to reside on or substantially near an in-process part surface.

Figure 5:
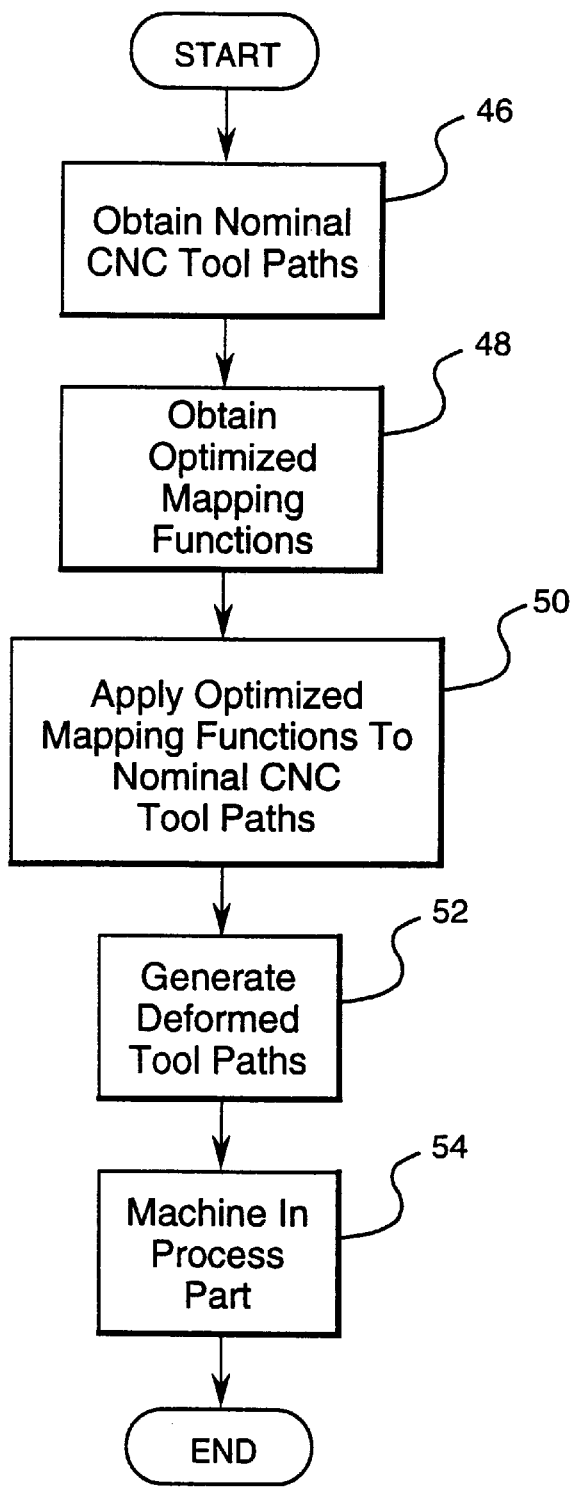
FIG. 5 shows a flow chart setting forth the steps for modifying nominal computerized NC tool paths into deformed tool paths according to this invention.
Figure 6:
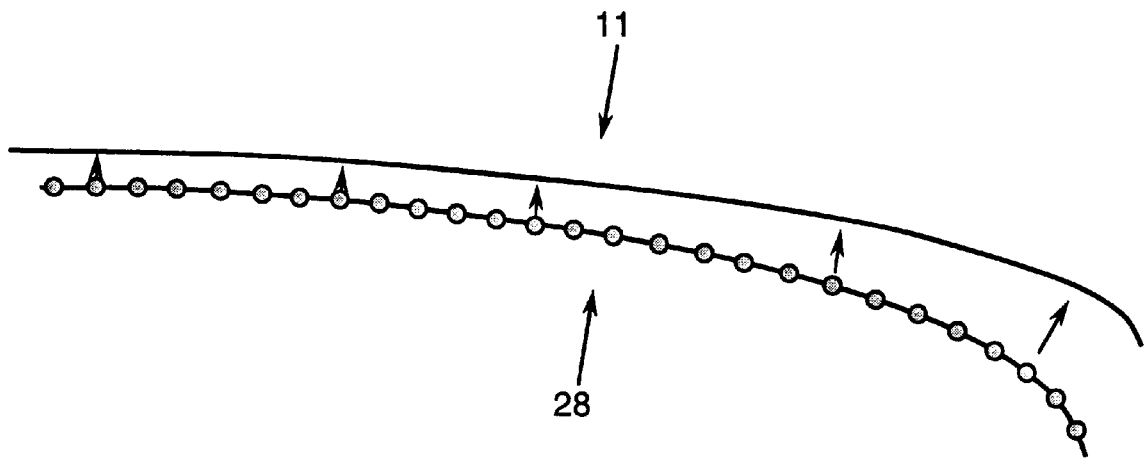
FIG. 6 shows a schematic of the nominal computerized NC model tool paths being mapped to the in-process part according to this invention.

After transforming the nominal model to the in-process part, the computer 16 modifies the CNC tool paths 28 to the measured coordinate system of the part according to the deformation model. The modification of the nominal CNC tool paths 28 results in the deformed tool paths 30 that the CNC controller 32 uses to control a particular NC manufacturing process. FIG. 5 shows a flow chart setting forth the steps for modifying the nominal CNC tool paths into the deformed tool paths according to this invention. The computer obtains the nominal CNC tool paths at 46. The nominal CNC tool paths comprise a plurality of points and vectors in the nominal model coordinate system. FIG. 6 shows a schematic of the nominal CNC model tool paths being mapped to the in-process part.

Figure 7:
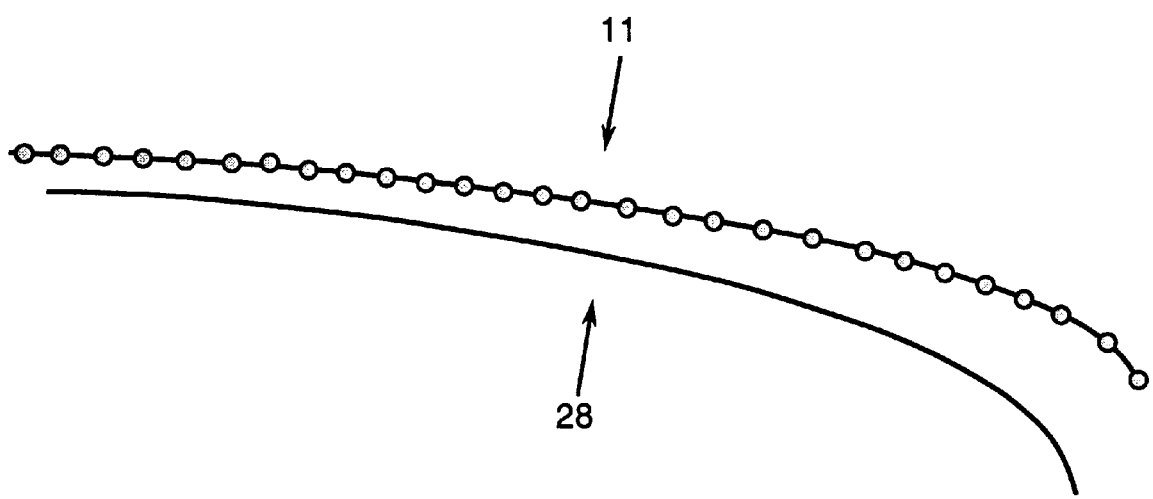
FIG. 7 shows a schematic of the nominal computerized NC model tool paths transformed to reside on or substantially near the surface of the in-process part according to this invention.

Referring back to FIG. 5, after obtaining the nominal CNC tool paths, the computer then obtains the optimized mapping functions at 48. The computer applies the optimized mapping functions to the nominal CNC tool paths at 50. In particular, for each point and vector that comprise the nominal CNC tool paths, the mapping functions move the tool path into an appropriate orientation and position with respect to the deformed in-process part. The mapping functions move the tool path into an appropriate orientation and position with the deformed in-process part by substituting the coordinates of the original NC program into the mapping function $f_1$, $f_2$, $f_3$. The mapping functions are then evaluated to compare an x, y, z point in proximity with the in-process part surface. After applying the optimized mapping functions to the CNC tool paths, the computer generates the deformed tool paths at 52. FIG. 7 shows a schematic of the nominal CNC model tool paths transformed to reside on or substantially near the surface of the in-process part. The CNC controller then uses the deformed tool paths to machine thee in-process part at 54.

Figure 8:
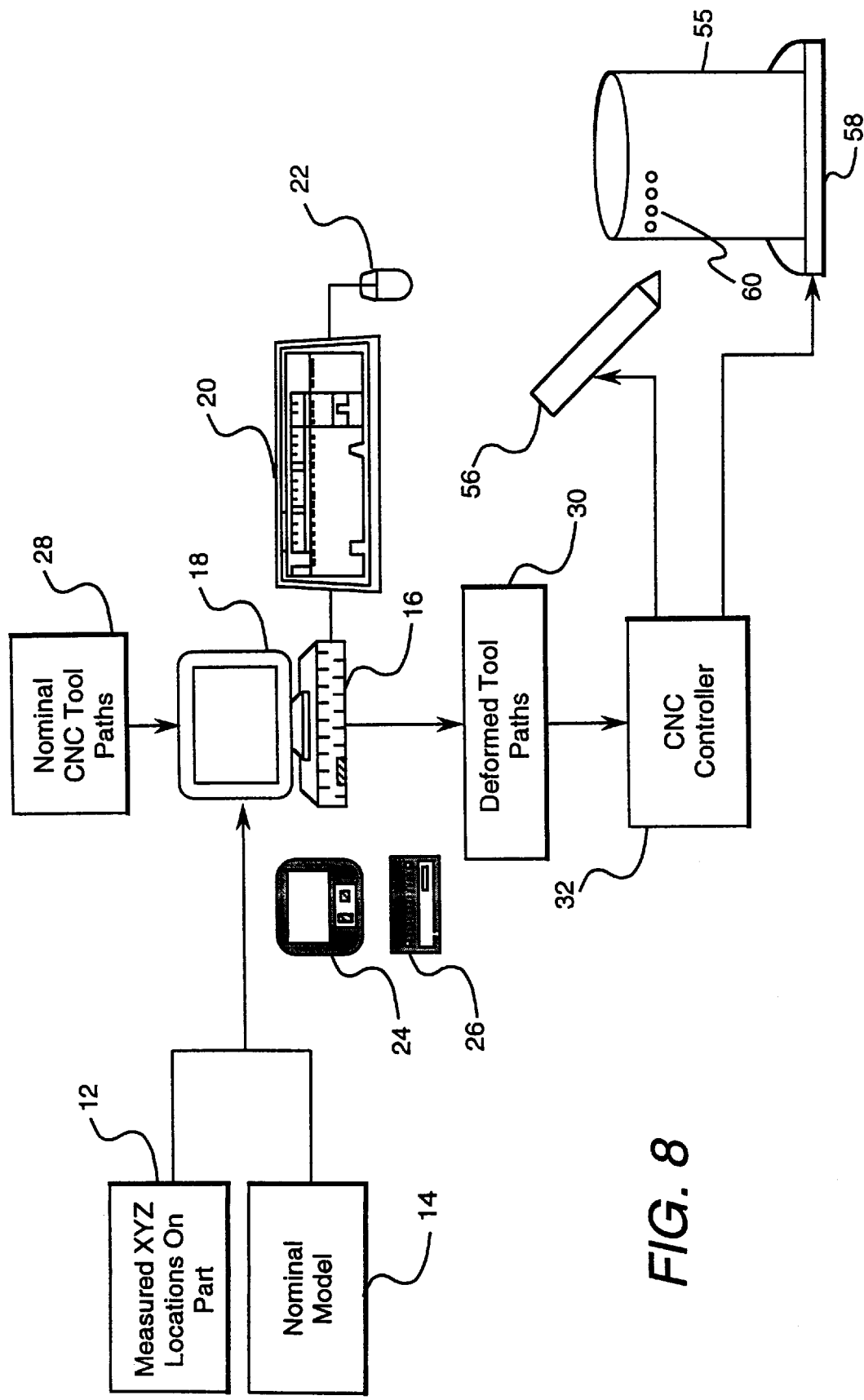
FIG. 8 shows a block diagram of an NC manufacturing process ope ating in accordance with this invention.

As mentioned above, the CNC controller 32 uses the deformed tool paths to control a particular NC process. FIG. 8 shows a block diagram of an NC process operating in accordance with this invention. The type of NC process shown in FIG. 8 is an NC drilling operation of a sheet metal part 55 for a combustor with a laser tool 56. Those skilled in the art will recognize that the operation illustrated in FIG. 8 is not intended to limit this invention. In fact, this invention can be used in a variety of NC processes such as machining, inspecting, forging, non-contact measurement systems, surface finishing systems, etc. In this NC drilling operation, a rotary table 58 supports the sheet metal part 55 while the laser tool 56 drills a pattern of boring holes 60 in the part at a specific angle. The CNC controller 32 may either rotate the table 58 and drill the boring holes 60 with the laser or move the laser about the sheet metal part 55.

Figure 9:
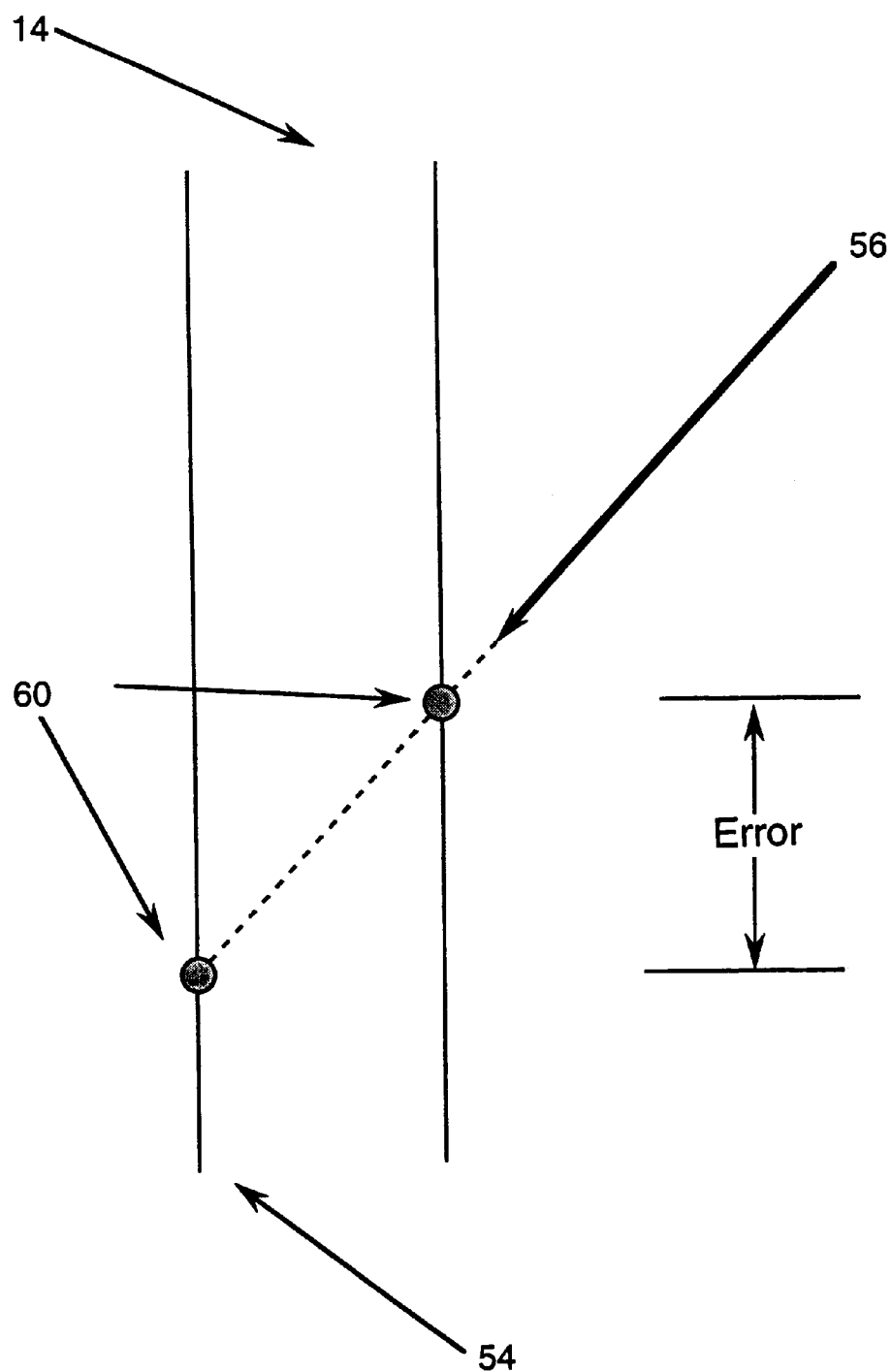
FIG. 9 shows a schematic of a result of an NC manufacturing process that does not operate in accordance with this invention.

Without the use of this invention, the CNC controller 32 would drill the boring holes 60 in improper locations along the surface of the part 55 because it is programmed to drill the holes for a nominal shape. FIG. 9 shows a schematic of the hole location errors that would result without the use of this invention. In particular, the laser 56 would drill a hole 60 according to the nominal model 14 which would reside along the surface of the part 55 at an incorrect location. FIG. 9 illustrates the difference in the location of the hole by the "Error" notation. A part 55 that has holes 60 drilled in improper locations along its surface will typically have to be discarded as scrap. Since this invention takes into account the deformation between the nominal model and the sheet metal part, the CNC controller 32 can use the deformed tool paths 30 generated therefrom to ensure that the part has the holes drilled into reasonable locations.

It is therefore apparent that there has been provided in accordance with the present invention, a system and method for NC processing of an in-process part that fully satisfy the aims and advantages and objectives hereinbefore set forth. The invention has been described with reference to several embodiments, however, it will be appreciated that variations and modifications can be effected by a person of ordinary skill in the art without departing from the scope of the invention.

What is claimed is:

1. A system for NC processing of an in-process part, comprising:
   a nominal model of the in-process part;
   means for measuring a series of n points on the in-process part;
   a processor for generating a deformation model that approximates deformation of the measured part relative to the nominal model, the processor comprising:
      means for determining a plurality of mapping functions for mapping point locations from the nominal model to approximate measured locations of points on the in-process part;
      means for optimizing the plurality of mapping functions to minimize the distance between the point locations from the nominal model to the measured locations of points on the in-process part; and
      means for transforming the point locations from the nominal model to the measured locations of points on the in-process part according to the plurality of optimized mapping functions; and
   a computerized numerical controller for controlling the processing of the in-process part according to the deformation model.

2. The system according to claim 1, wherein the measuring means comprises a coordinate measuring machine.

3. The system according to claim 1, wherein the measuring means comprises an x-ray scanning machine.

4. The system according to claim 1, wherein the measuring means comprises an optical scanning machine.

5. The system according to claim 1, wherein the measuring means comprises an ultrasound scanning machine.

6. The system according to claim 1, wherein the processor further comprises means for generating a series of n pairings of points between the nominal model and the measured series of n points on the in-process part, wherein each pairing between the nominal model and the measured series of n points substantially corresponds to each other.

7. The system according to claim 6, wherein the measured series of n points on the in-process part are an x, y, z coordinate system and points of the nominal model are in an X, Y, Z coordinate system.

8. The system according to claim 7, wherein the plurality of mapping functions comprise functions $f_1$, $f_2$, $f_3$ for mapping nominal model point locations $X_i$, $Y_i$, $Z_i$ to approximate measured part point locations $x_i$, $y_i$, $z_i$, wherein:

$$f_1(X_i, Y_i, Z_i) - x_i = X_{ierror}$$
$$f_2(X_i, Y_i, Z_i) - y_i = Y_{ierror}, i=1, \ldots, i, \ldots n$$
$$f_3(X_i, Y_i, Z_i) - z_i = Z_{ierror}$$

wherein $X_{ierror}$, $Y_{ierror}$, and $Z_{ierror}$ are the differences between the nominal model point locations and the measured part locations.

9. The system according to claim 8, wherein the optimizing means minimizes the distance between the point locations from the nominal model to the measured locations of points on the in-process part with a minimization function.

10. The system according to claim 1, wherein the transforming means transforms the point locations from the nominal model to reside on or substantially near measured locations of points on the in-process part.

11. The system according to claim 1, further comprising a plurality of nominal computerized numerical controlled tool paths for processing the in-process part.

12. The system according to claim 11, wherein the processor comprises means for modifying the plurality of nominal computerized numerical controlled tool paths to the coordinate system of the in-process part according to the deformation model.

13. The system according to claim 12, wherein the computer numerical controller controls the processing of the in-process part according to the modified tool paths.

14. A method for NC processing of an in-process part, comprising:
   obtaining a nominal model of the in-process part;
   measuring a series of n points on the in-process part;
   determining a plurality of mapping functions for mapping point locations from the nominal model to approximate measured locations of points on the in-process part;

optimizing the plurality of mapping functions to minimize the distance between the point locations from the nominal model to the measured locations of points on the in-process part;

transforming the point locations from the nominal model to the measured locations of points on the in-process part according to the plurality of optimized mapping functions; and controlling the processing of the in-process part according to the transformation.

15. The method according to claim 14, further comprising generating a series of n pairings of points between the nominal model and the measured series of n points on the in-process part, wherein each pairing between the nominal model and the measured series of n points substantially corresponds to each other.

16. The method according to claim 15, wherein the measured series of n points on the in-process part are in an x, y, z coordinate system and points of the nominal model are in an X, Y, Z coordinate system.

17. The method according to claim 16, wherein the plurality of mapping functions comprise functions $f_1$, $f_2$, $f_3$ for mapping nominal model point locations $X_i$, $Y_i$, $Z_i$ to approximate measured part point locations $x_i$, $y_i$, $z_i$, wherein:

$$f_1(X_i, Y_i, Z_i) - x_i = X_{ierror}$$

$$f_2(X_i, Y_i, Z_i) - y_i = Y_{ierror}, i=1, \ldots i, \ldots n$$

$$f_3(X_i, Y_i, Z_i) - z_i = Z_{ierror}$$

wherein $X_{ierror}$, $Y_{ierror}$, and $Z_{ierror}$ are the differences between the nominal model point locations and the measured part locations.

18. The method according to claim 17, wherein the optimizing minimizes the distance between the point locations from the nominal model to the measured locations of points on the in-process part with a minimization function.

19. The method according to claim 14, wherein the transforming transforms the point locations from the nominal model to reside on or substantially near measured locations of points on the in-process part.

20. The method according to claim 14, further comprising obtaining a plurality of nominal computerized numerical controlled tool paths for processing the in-process part.

21. The method according to claim 20, further comprising modifying the plurality of nominal computerized numerical controlled tool paths to the coordinate system of the in-process part according to the transformation.

22. The method according to claim 21, further comprising controlling the processing of the in-process part according to the modified tool paths.

23. An article of manufacture, comprising:

a computer usable medium containing computer readable program code means embodied therein for NC processing of an in-process part, the computer readable program code means in the article of manufacture comprising:

computer readable program code means for obtaining a nominal model of the in-process part;

computer readable program code means for measuring a series of n points on the in-process part;

computer readable program code means for determining a plurality of mapping functions for mapping point locations from the nominal model to approximate measured locations of points on the in-process part;

computer readable program code means for optimizing the plurality of mapping functions to minimize the distance between the point locations from the nominal model to the measured locations of points on the in-process part;

computer readable program code means for transforming the point locations from the nominal model to the measured locations of points on the in-process part according to the plurality of optimized mapping functions; and computer readable program code means for controlling the processing of the in-process part according to the transformation.

24. The article of manufacture according to claim 23, further comprising computer readable program code means for generating a series of n pairings of points between the nominal model and the measured series of n points on the in-process part, wherein each pairing between the nominal model and the measured series of n points substantially corresponds to each other.

25. The article of manufacture according to claim 24, wherein the measured series of n points on the in-process part are i an x, y, z coordinate system and points of the nominal model are in an X, Y, Z coordinate system.

26. The article of manufacture according to claim 25, wherein the plurality of mapping functions comprise function $f_1$, $f_2$, $f_3$ for mapping nominal model point locations $X_i$, $Y_i$, $Z_i$ to approximate measured part point locations $x_i$, $y_i$, $z_i$ wherein:

$$f_1(X_i, Y_i, Z_i) - x_i = X_{ierror}$$

$$f_2(X_i, Y_i, Z_i) - y_i = Y_{ierror}, i=1, \ldots i, \ldots n$$

$$f_3(X_i, Y_i, Z_i) - z_i = Z_{ierror}$$

wherein $X_{ierror}$, $Y_{ierror}$, and $Z_{ierror}$ are the differences between the nominal model point locations and the measured part locations.

27. The article of manufacture according to claim 26, wherein the optimizing computer readable program code means minimizes the distance between the point locations from the nominal model to the measured locations of points on the in-process part with a minimization function.

28. The article of manufacture according to claim 23, wherein the transforming computer readable program code means transforms the point locations from the nominal model to reside on or substantially near measured locations of points on the in-process part.

29. The article of manufacture according to claim 23, further comprising computer readable program code means for obtaining a plurality of nominal computerized numerical controlled tool paths for processing the in-process part.

30. The article of manufacture according to claim 29, further comprising computer readable program code means for modifying the plurality of nominal computerized numerical controlled tool paths to the coordinate system of the in-process part according to the transformation.

31. The article of manufacture according to claim 30, further comprising computer readable program code means for controlling the processing of the in-process part according to the modified tool paths.

* * * * *